(12) United States Patent
Steiner, III

(10) Patent No.: US 6,764,667 B1
(45) Date of Patent: Jul. 20, 2004

(54) METHOD FOR THE FORMATION OF AEROGEL PRECURSOR USING RAPID GELATION TWO-STEP CATALYSIS

(76) Inventor: Stephen A. Steiner, III, 1001 W. Brentwood La., Glendale, WI (US) 53217

( * ) Notice: Subject to any disclaimer, the term of this patent is extended or adjusted under 35 U.S.C. 154(b) by 294 days.

(21) Appl. No.: 10/092,266

(22) Filed: Mar. 8, 2002

Related U.S. Application Data

(60) Provisional application No. 60/310,631, filed on Mar. 9, 2001.

(51) Int. Cl.[7] .............................................. C01B 33/12
(52) U.S. Cl. ....................................... 423/338; 423/324
(58) Field of Search ................................ 423/324, 335, 423/338

(56) References Cited

U.S. PATENT DOCUMENTS

| | | |
|---|---|---|
| 4,402,927 A | 9/1983 | von Dardel et al. |
| 4,595,578 A | 6/1986 | Cohen et al. |
| 4,619,908 A | 10/1986 | Cheng et al. |
| 4,717,708 A | 1/1988 | Cheng et al. |
| 5,019,146 A | 5/1991 | Hara |
| 5,227,239 A | 7/1993 | Upadhye et al. |
| 5,275,796 A | 1/1994 | Tillotson et al. |
| 5,496,527 A | 3/1996 | Yokogawa et al. |
| 5,738,801 A | 4/1998 | Ziegler et al. |
| 5,746,992 A | 5/1998 | Yoldas et al. |
| 5,790,742 A | 8/1998 | Tsubaki et al. |
| 5,795,557 A | 8/1998 | Pajonk et al. |
| 5,935,895 A | 8/1999 | Baiker et al. |
| 5,973,015 A | 10/1999 | Coronado et al. |

*Primary Examiner*—Stanley S. Silverman
*Assistant Examiner*—Edward M. Johnson
(74) *Attorney, Agent, or Firm*—Boyle Fredrickson Newholm Stein & Gratz, S.C.

(57) ABSTRACT

A rapid gelation, two-step method for the production of an aerogel precursor is disclosed. The method involves the addition of a small amount of catalyst during mixing of alcogel components in order to allow some pre-polymerization to occur. Next, the addition of the remainder of the catalyst quickly forms or gels the solution into the alcogel. The gelation of the solution to form the alcogel typically takes place in 5 to 60 seconds, but can be done in under 1 second and in as long as several hours. The gel time can be controlled specifically by adjusting the chemical contents of the solution and the amount of time between the two additions of catalyst. The resulting alcogel can then be processed further to form an aerogel which can be put to use in many unique applications including fabrics, insulative blocks, and microchips.

22 Claims, 3 Drawing Sheets

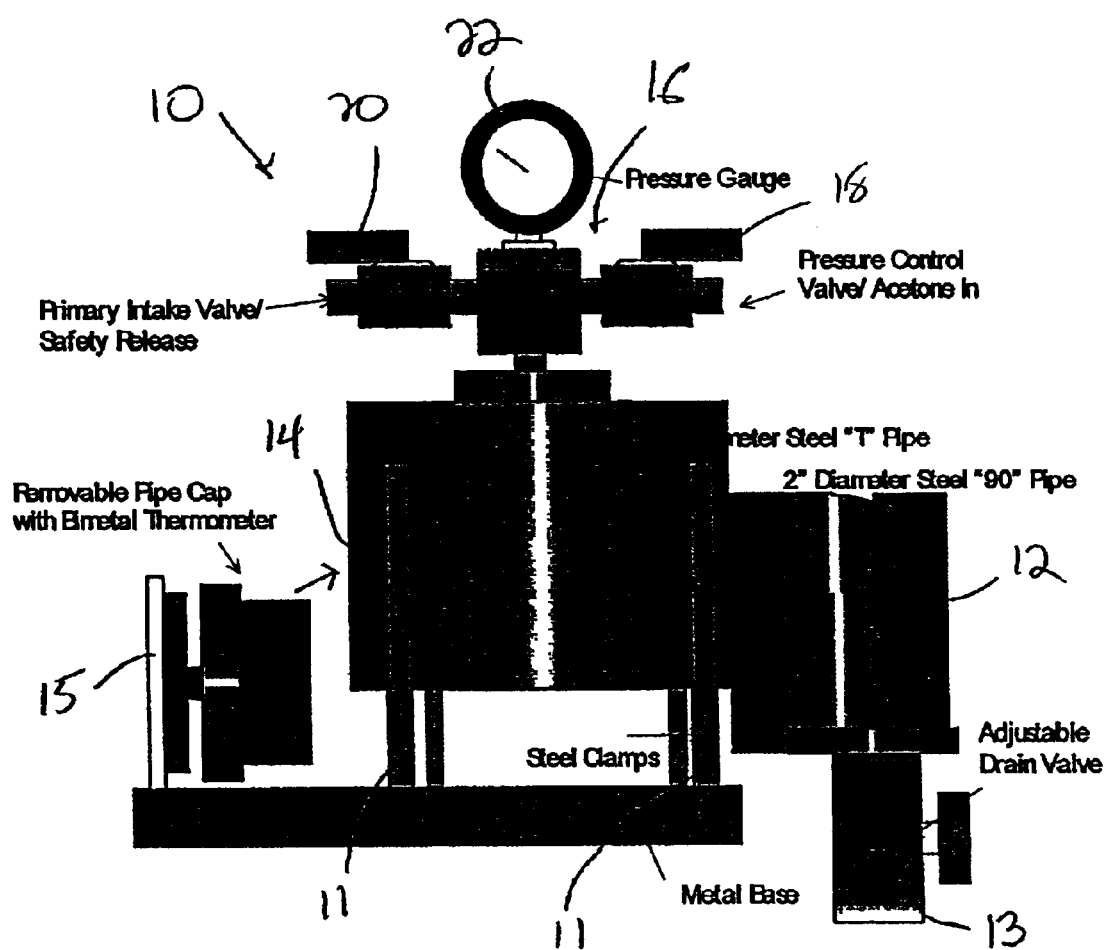

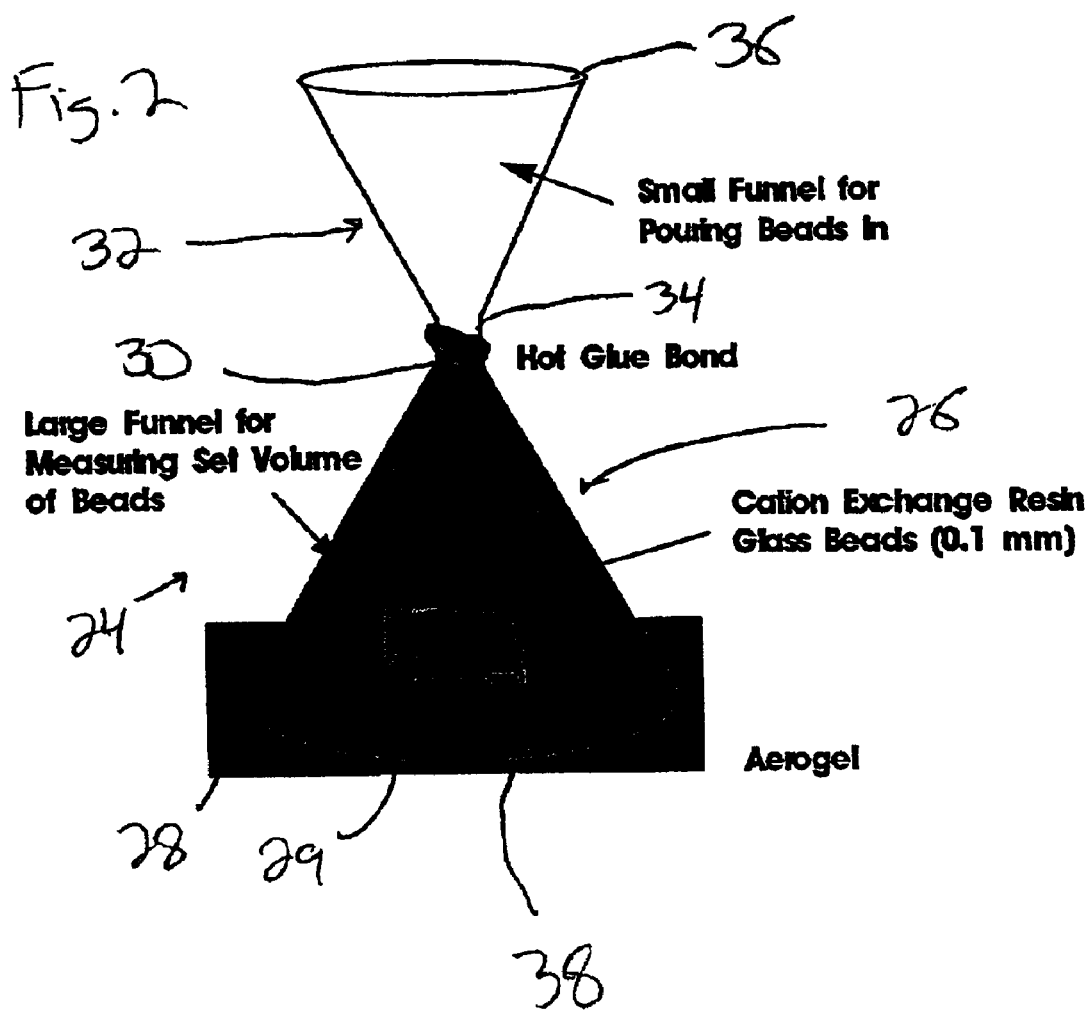

METHOD FOR THE FORMATION OF AEROGEL PRECURSOR USING RAPID GELATION TWO-STEP CATALYSIS

CROSS-REFERENCE TO RELATED APPLICATION

This patent application claims priority from U.S. Provisional Patent Application Serial No. 60/310,631, which was filed Mar. 9, 2001.

BACKGROUND OF THE INVENTION

Aerogel is a low-density, nanoporous solid material composed of 50 to >99% air by volume. Aerogel is typically prepared by supercritically extracting the liquid medium from gel in such a way that the gel's solid matrix is isolated without collapsing due to capillary forces. Aerogel typically shows densities ranging between 0.5 g/cm$^3$ to 0.001 g/cm$^3$, yet at the same time can support between 500 and 4,000 times its weight in an applied force distributed across its surface area. Internal surface areas in aerogels range from 250 m$^2$/g to 2,500 m$^2$/g, giving them excellent insulative and impact-absorbing capabilities.

Aerogels are prepared by supercritically drying precursor gels called alcogels. A gel is a colloidal system in which a network of interconnected solid particles spans the volume of a liquid medium. In the most researched type of aerogel, silica aerogel, this gel is composed of a silica matrix spanning a solvent such as ethanol or acetone.

Modern aerogel is synthesized by the sol-gel process, in which a metal alkoxide is reacted with water in a polar organic solvent to yield a colloidal system of oligomeric silica clusters suspended in the solvent, or a sol, which, upon further polymerization, forms a gel.

Aerogel was discovered by Samuel Steven Kistler in the 1930s at the College of the Pacific (Stanford University)[1]. Aerogel was only researched extensively, however, in the 1980s when NASA investigated it as a possible medium for capturing micrometeoroids during space flights. Since then, aerogel production has been significantly improved, and has made aerogel popular in numerous applications industrially, commercially, and in research. NASA used aerogel on the Mars Pathfinder probe to survey the atmosphere of Mars, and has used it on several probes as micrometeor sponge.

[1]NASA Jet Propulsion Laboratory. *Aerogel*. March 1996.

Despite its useful properties, aerogel's use has been greatly limited by the expense and difficulty of its manufacture. In addition, aerogel's blue color has prevented it from being usable in applications such as windowpanes and other transparent insulation applications.

Preparation of Alcogel

Silica aerogel, is typically formed by the reaction of a silicon alkoxide with water to form an alcogel through the sol-gel process. Alcogel can then be supercritically dried to leave behind the silica matrix that gave the precursor alcogel its rigidity. The resulting low-density solid material is aerogel. Examples of silicon alkoxides include tetramethyl orthosilicate and tetraethyl orthosilicate.

The formation of the alcogel is the step in which the physical and nanostructural properties of the aerogel are defined. Since the polymer matrix of which the aerogel will be composed is assembled during the gelation process, the chemistry of the alcogel solution can be adjusted to give specific properties to the derivative aerogel.

Silica alcogel will be used as the subject of discussion for chemical reactions, since it is of most relevance to the method of the invention.

The net reaction for the formation of the alcogel is as follows[2]:

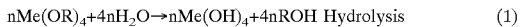

nMe(OR)$_4$+4nH$_2$O→nMe(OH)$_4$+4nROH  Hydrolysis     (1)

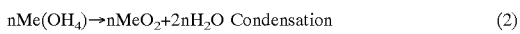

nMe(OH$_4$)→nMeO$_2$+2nH$_2$O  Condensation     (2)

R=alkyl group (i.e. C$_2$H$_5$)

The metal alkoxide reacts with four moles of water yielding hydroxyl groups and four moles of alcohol. The hydroxyl groups then condense to produce a metal oxide and water. This happens in a three-step reaction mechanism[2].

≡MeOR+HOH⟶≡MeOH+ROH  Hydrolysis     (1)

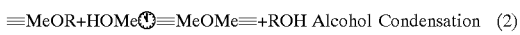

≡MeOR+HOMe⟶≡MeOMe≡+ROH  Alcohol Condensation     (2)

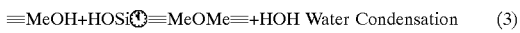

≡MeOH+HOSi⟶≡MeOMe≡+HOH  Water Condensation     (3)

[2]Tillotson, Thomas M. and Hrubesh, Lawrence.

As the reactions occur, the solution forms a sol of silica clusters capped by alkyl and hydroxyl groups. These clusters can be made to interconnect to form a matrix throughout the liquid medium thus forming a gel. This process, known as the sol-gel process, allows for metal oxide to carefully form and interconnect by network-type bonds. After gelation occurs, the alcogel is aged and soaked in an organic solvent for several days to remove any unwanted water, catalyst, and alcohol.

Once an alcogel has been diffused with a pure solvent, preferably a non-alcoholic solvent such as toluene, it can be dried to produce an aerogel. Upon evaporation, like gelatin, a gel will condense into a hard glass-like material. As liquid is evaporated out of the silica matrix of an alcogel, hydroxyl groups lining the edges of the matrix interact by weak hydrogen bonding and stick together. As capillary action pulls the matrix inward, the hydrogen bonding causes the matrix to stick and collapse. There are ways to prevent the solid matrix from collapsing, however, such as supercritically extracting the solvent from the gel.

The supercritical extraction process requires that the gel's solvent be brought past its critical point—the temperature and pressure that once reached, the substance cannot condense into a liquid by adding further pressure. Such supercritical fluids have extremely rapid diffusion rates, and possess some properties similar to liquids, such as density, and other properties similar to gases, such as expansion[3]. Supercritical extraction allows for removal of the liquid solvent from the gel while still providing the physical support needed to prevent the solid matrix from collapsing. At critical point, the solvent in the gel can diffuse into the surroundings without disrupting the structure of the silica matrix be vented and replaced with air. Once the system is cooled and depressurized, the gel's solid matrix is left intact. The remaining solid is a network of amorphous particles linked in a superstrong matrix, in the shape of the original alcogel and with approximately the same volume.

[3]Pardue, Harry and Bodner, George. *Chemistry: The Experimental Science*. New York, N.Y.: John Wiley and Sons, Inc. Copyright 1995.

One problem with the supercritical extraction is that organic solvents used in the preparation of the alcogels not only have high critical temperatures and pressures, but are extremely flammable at those conditions and are very dangerous to work with. Arlon Hunt of Lawrence Berkeley National Laboratory demonstrated that a solvent exchange with liquid $CO_2$ can be performed prior to extraction of the solvent from the gel to greatly reduce the danger associated with the extraction process. Carbon dioxide has the benefits of being non-flammable, miscible with organics, and having a low critical point of 31.1° C. at 75 atmospheres[4]. For the supercritical drying to succeed, alcogel must soak in liquid $CO_2$ long enough for the $CO_2$ to completely diffuse through the gel and take the place of the organic solvent. The $CO_2$ can then be brought to supercritical temperatures and pressures for solvent extraction, instead of the organic solvent.

[4]Weast, Robert ed. *Handbook of Chemistry & Physics*, 48th Edition. Cleveland, Ohio: Chemical Rubber Co. Copyright 1967.

Origin of Rayleigh Scattering in Aerogels and Ways to Reduce it

Nearly all silica aerogels exhibit a blue appearance despite being transparent. The blue color is a result of Rayleigh scattering of white light as it passes through the aerogel's nanopores[5]. These nanopores, sized from 5 to 150 nm across, are much smaller than the wavelengths of visible light, yet large enough to scatter the higher frequency colors. The larger of these pores scatter visible light more easily. The larger pores (>15 nm) cause most of the scattering in the aerogel. Shorter wavelengths are diffracted more than longer wavelengths, and therefore blue and violet light are diffracted the most. Although both blue and violet light are diffracted by these nanopores, only a blue color is perceived. This is because the human eye is more sensitive to blue light than any other color, and so violet light scattered by the aerogel is perceived to be mostly blue.

[5]Hrubesh, Lawrence W. and Poco, John F. *Processing and Characterization of High Porosity Aerogels*. Lawrence Livermore National Laboratory Reports. (1994).

The insulative properties of silica aerogel make it an ideal material for insulation for many applications, including the possibility of using it as transparent insulation for windowpanes. The blue scattering in silica aerogel, however, prevents it from being practical in commercial and industrial applications.

It has been proposed by researchers at Lawrence Berkeley Laboratory and the University of Wisconsin that the formation of silica aerogel in microgravity may allow for a greater control over the formation of the silica matrix, narrowing the distribution of pore diameters closer to the 5–15 nm region. The result would be increased ultraviolet scattering and decreased blue-violet scattering, causing the aerogel to appear transparent. To do this, a controllable process is required to allow for the formation of silica aerogel in zero-gravity, and gel times must be adjustable to accommodate for the zero-gravity environments available, for example a KC-135 flight or a drop tower.

Current methods of producing silica aerogel are lengthy, lack fine adjustability, and are expensive. There exist several applications for which inexpensive, controllable production processes are needed. Therefore, it is desirable to develop a process that allows for the production of silica alcogel that is both inexpensive and controllable, which can be followed by an inexpensive procedure to produce aerogel.

OBJECTIVES OF THE INVENTION

1) The objectives of the present invention are as follows: The production of silica alcogel by means of a unique, two-step catalysis procedure that allows for adjustable liquid-to-gel (gelation) times ranging from under 1 second to as long as several hours without formation of opaque species in the gel 2) The production of silica aerogel by means of an inexpensive supercritical drying device made from readily available materials 3) The dry density analysis of aerogels by means of a volumeter 4) The application of the two-step protection process to other related processes including:

a) A process for the formation of silica alcogel using gaseous catalysis b) A process for laminating aerogel with silica glass or plastic c) A process for spray-on or sputter application of aerogel d) A process for the addition of aerogel to microcircuitry e) A process for the formation silica aerogel microspheres by anti-bubble gelation and theological anti-bubble gelation f) Application of aerogel as aerogel fibers for use in fabric and clothing g) Application of aerogel as snap-together aerogel building blocks for constructing larger aerogel structures h) Application of rapid gelation process in reduced and induced gravity environments

SUMMARY OF THE INVENTION

In the method of the present invention, an inexpensive way has been developed to controllably produce silica alcogel in a simple laboratory setting using readily available materials. The resulting procedure allows for the transformation of alcogel solution into gel in times ranging from under one second to several hours (up to 24 hours) using a multiple-step catalysis process, without a need for heat. Other procedures require a minimum of several minutes for gelation, and lose clarity when gelation is induced faster by increasing catalyst concentration or adding heat. In the method of the present invention, alcogels of varying volumes can be formed in a fraction of second without loss of clarity. The invention allows for increased control of the production requirements for the alcogel and production of new, unique aerogel shapes and applications, including the ability to use gaseous catalysis to form thin-film gels.

In the method of the present invention, an alcogel, such as silica alcogel, is prepared by sol-gel gelation. In one method, silicon alkoxide is reacted with water in a dilution solvent and precatalyzed with a basic or acidic catalyst. The solution is allowed to react for a period of time, and catalyzed again to induce rapid gelation. The amount of dilution solvent and catalyst added affects the resulting alcogel's structure and density. The time delay between these two catalyses affects the gel time of the alcogel solution.

To supercritically dry the alcogels produced by this process and also other alcogels not produced by this process, a manually-controlled supercritical drying device was constructed from welded steel pipes, valves, and gauges. This device is called a manuclave. The aerogels produced by the two-step catalysis show optical clarities comparable to aerogels produced by other similar methods, reduced Rayleigh scattering, and densities of 0.080 g/cm3 to 0.010 g/cm$^3$. In addition, they exhibit reduced Rayleigh scattering when compared to aerogels formed using prior art methods.

Aerogels produced by this method and other prior methods can be analyzed using a dry volumeter that allows for the measurement of an aerogel's volume without submerging the aerogel under a liquid and thus destroying it.

BRIEF DESCRIPTION OF THE DRAWINGS

The drawing figures illustrate the best mode currently contemplated of practicing the invention.

In the drawings:

FIG. 1 is a front plan view of a manuclave used in the method of the present invention;

FIG. 2 is a front plan view of a dry volumeter used in the method of the present invention.

DETAILED DESCRIPTION OF THE INVENTION

Figure 3A:
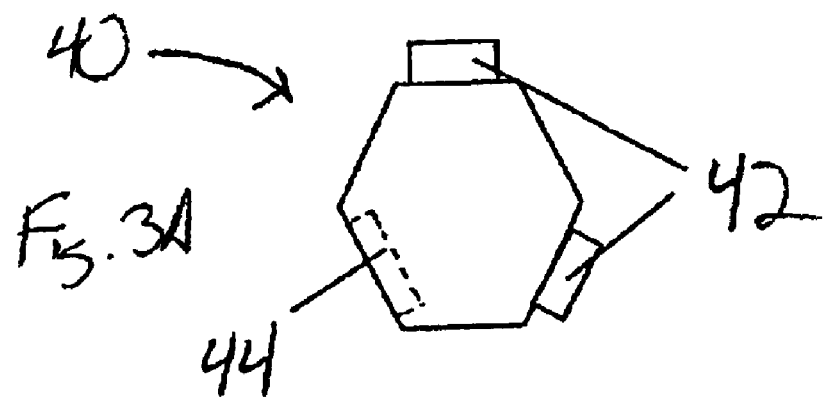
FIGS. 3A–B are side plan views of snap-together building block products formed with aerogels formed using the method of the present invention.

Previous procedures, as mentioned before, required several hours for the aerogel precursor solution to gel. This makes certain research difficult, for example thin film research and microgravity research, and limits the shape of aerogels produced, manufacturing processes to produce aerogel, and the control over the aerogel properties.

The method of the present invention is a method for rapid gelation of silica alcogel, in which the gel precursor changes into a gel in a very short amount of time, from under one second to many hours. This has many unique benefits, for example, producing alcogel outside of a mold, in applications like sprays or thin films. The process is a rapid gelation, two-step catalysis process, in which alcogel precursor solution is specially prepared so that the time required from catalysis to gel point is controllable by adjusting the ratios of reagents and catalyst and the volume of solvent used. This allows for gel times of less than one second, and as long as several hours. The first step, preparing the sol, may be done in many additions of catalyst. The gel point is considered to be the point at which the gel can stand by itself as a solid.

The first step in the process is the preparation of a rapidly-gellable sol. This may be done by adding an amount of catalyst to a solution of metal alkoxide, solvent, and water, to all for reaction to occur but not enough to allow for gelation. Further amounts of catalyst may be added over a period of time. The second step is the gelation of the sol. This is done by adding a sufficient amount of a catalyst to cause the sol to gel in a given amount of time. Higher concentrations of catalyst in the first step will result in a sol that requires less concentration of catalyst in the second step and/or less time to react before the second step can be induced. Lower concentrations of catalyst in the first step will result in a sol that requires larger concentration of catalyst in the second step and/or longer time to react before the second step can be induced. The amount of time between the two catalytic steps is a major determining factor in the amount of time required for gelation of the sol.

The process may be explained by the reaction mechanism of the alkoxysilane polymerization process. There are three steps, as mentioned and illustrated before, in the mechanism, namely: 1) hydrolysis, 2) alcohol condensation; and 3) water condensation (Equations 1–3). The reaction rate is dependent on the rate at which the slowest reaction in the reaction mechanism occurs, and since the hydrolysis of alkoxysilane and water is slow at room temperature, a catalyst must be used to accelerate the process. Typically, the alkoxide is catalyzed by adding ammonium hydroxide, sodium hydroxide, hydrochloric acid, or any of a number of other acidic or basic catalysts, as the reaction is affected by the solution's pH.

After catalysis, the liquid precursor is allowed to react in a mold until gel point is reached, normally after several minutes or several hours. In some procedures, the liquid is refluxed to reduce the pore size of the resulting alcogel.

Experimental results of the invention show that if an alcogel solution is undercatalyzed, meaning not enough catalyst was added, no gel will form despite the amount of time the solution is allowed react. This may be due to a lack of sufficient alkoxide groups being converted to hydroxyl groups in the hydrolysis step, and alcohol condensation cannot occur and thus no gel forms. This is the proposed mechanism for the workings of the first step. If the solution is overcatalyzed, the solution will precipitate silicon hydroxide due to a complete conversion of the alkoxide groups to hydroxyl groups producing insoluble $Si(OH)_x$ species. Both alkoxide and hydroxyl groups must be present among the molecules in the solution for polymerization to occur. If the pH of the alkoxide solution is not within a specific range, as is known, the solution will not polymerize. In single-step catalysis gelation, a buffer (such as ammonium fluoride) is used and polymerization is able to occur. This adds cost to the procedure, makes gel time long, and is difficult to do.

In the two-step catalysis procedure of the present invention, alkoxide is precatalyzed, allowing partial hydrolysis and alcohol condensation to occur. This attempts to achieve the effect of condensing smaller alkoxysilane molecules into larger clusters, that, upon further catalysis, will condense quickly into a very large cluster which becomes the gel matrix. The time between the two catalyses is related to the rate at which the solution gels, approximated by an $a/x^3$ relation, where a is a constant and x is the time between the two steps.

The procedure is as follows. A solution of alkoxysilane, water, and dilution solvent is prepared. Excess solvent can be added to decrease the density of the resulting alcogel and has been shown to decrease the Rayleigh scattering in the derivative aerogel. A small amount of concentrated ammonium hydroxide solution, concentrated hydrochloric acid solution, or other catalyst is added to allow for precondensation of the alkoxide to occur. The solution is allowed to sit for a length of time, which as mentioned before, will determine the rate at which the liquid will gel. The solution then contains prepolymer siloxane clusters with siloxane bonds forming forming the cluster networks and unreacted alkoxide groups and hydroxyl groups along the sides of the clusters. After the solution has been allowed to stand for a period of time, the solution is catalyzed again, inducing water condensation. The silica clusters interconnect during water condensation, and a gel forms. Larger sol oligomers result in a lower time required for the solution to reach gel point.

The procedure also allows for other solvents to be used. Some of the other solvents that can be used include methanol, isopropanol, acetone, and tetrahydrofuran.

Furthermore, the catalyst concentration can be changed to allow for adjustment of the time between the first step and the second step.

The procedure is scalable, and can be done in smaller fractions or in larger multiples, however, catalyst concentration must adjusted in proportion the amount of alcogel being formed. At a certain volume, gel times are limited by the ability to introduce catalyst evenly across the alcogel solution.

I. Example Process for Two-Step Catalysis Rapid Gelation Production of Silica Alcogel Process 1. An alkoxide solution of 5.0 mL TEOS (tetraethoxy silane $(Si(C_2H_5O)_4)$) or TMOS (tetramethoxy silane (Si ($CH_3O)_4$)) and 11.0 mL denatured or pure ethanol solvent is prepared. TMOS solutions gel much more rapidly than TEOS solutions, and catalyst pH must be adjusted appropriately to prevent gelation in the first step. TMOS alcogels are generally clearer and more rigid than TEOS alcogels.

2. A catalyst solution of 7.0 mL water, 10.5 mL denatured ethanol solvent, and 2 to 4 drops of 15.1 M ammonium hydroxide solution (for TEOS) or 2 to 4 drops of 6.0 M hydrochloric acid (for TMOS) is prepared. The amount of ethanol can be varied to change the density of the aerogel, but too little solvent will prevent the alkoxide and water from reacting since they will not mix.

3. The catalyst solution is mixed into the alkoxide solution and the resulting mixture is stirred.

4. The solution is allowed to sit between 3 to 48 hours. Depending on the length of this delay, the solution's "simultaneous gelation" time can be controlled specifically, as well as the resulting aerogel's optical clarity. Typical delay for maximizing both of these factors is about 15 to 20 hours.

5. After the delay, 2 to 4 more drops of 15.1 M ammonium hydroxide solution are added and quickly stirred in. The catalyst can be diluted in non-aqueous solvent.

6. Depending on the time delay used in step 4, the solution will gel within as little as 1 second and as much as 1 hour. For a typical delay, gel time is about 5–10 seconds.

7. The alcogel can be removed from its mold/shaping device.

II. Procedure for Aging and Soaking Alcogels for Supercritical Drying

1. The alcogel is placed in a container filled with a solvent such as dehydrated ethanol solvent, acetone, or tetrahydrofuran. This solvent will eventually replace the liquid medium in the gel.

2. The solvent is drained and replaced with fresh solvent every 6 hours as unreacted molecules, excess alcohol, catalyst, and water are removed from the gel. The solvent may gradually be made more non-polar by adding amounts of toluene, tetrachloromethane, or another non-polar solvent each time solvent is replaced.

3. After approximately 2 days, the gel will be completely diffused through with the appropriate solvent. The more non-polar the solvent is, the better it will be for carbon dioxide exchange.

4. The alcogel can be stored under the solvent indefinitely, as long as no catalyst or small alcohols remain in the gel.

III. Procedure for Operating the Manuclave and For Accomplishing Supercritical Drying The drying of alcogel to aerogel requires a special high pressure autoclave. A manually controlled device that accomplishes supercritical drying was constructed and used. This device is called a manuclave. The manuclave is illustrated in FIG. 1. The manuclave was designed to operate with liquid carbon dioxide to perform low temperature supercritical drying by carbon dioxide liquid exchange, but can be used to perform high-temperature, high-pressure supercritical extractions as well. Use of flammable solvents requires a nitrogen atmosphere or nitrogen purge during the supercritical drying process, and a passive heating system such as a hot silcone oil or water bath.

The following are the steps in the process for supercritically drying the alcogel:

1. An alcogel that has been soaked and aged in an organic solvent is selected and placed into a wire cage connected to a retrieval wire.

2. The wire cage is placed inside a manuclave vessel 10. The manuclave vessel 10 is a tank formed of a rigid material such as stainless steel, that is supported by a number of clamps 11 secured to the vessel 10. The vessel 10 includes an L-shaped drain pipe 12 with a liquid drain valve 13 on one side and an opening 14 opposite the drain pipe 12. A cap 15 is releasably engaged within the opening to enclose the vessel 10. The vessel 10 also includes a valve assembly 16 disposed on the top of the vessel 10. The assembly 16 includes a pressure control valve 18, an intake valve 20 and a pressure gauge 22. The cage is normally placed at the bottom of the "L" pipe 12 on the side of the vessel 10. This arrangement of components is only one of several ways the machine can be built to allow for different control over supercritical drying.

3. The removable pipe cap 15 (equipped with a bimetal thermometer) is wrapped with PTFE (Teflon™) anti-seizing tape and is screwed into the side of the manuclave 10.

4. The vessel is filled with solvent (dependent on what the alcogel had been soaked in) poured into the vessel through the pressure control valve 16.

5. All valves are checked and sealed off.

6. The liquid drain valve 13 is opened temporarily to assure that the solvent has collected over the alcogels.

7. The vessel 10 is slowly pressurized to vapor pressure of the solvent (750 psi or 53 $kg/cm^2$ for carbon dioxide).

8. The manuclave 10 is chilled in a freezer to allow solvent (such as $CO_2$) to liquefy.

9. As the vessel 10 chills, vapor pressure from the solvent is vented periodically through pressure control valve 18 to allow liquid to siphon in from the pressure tank (not shown) through the intake valve 20. After the vessel 10 has reached a temperature below room temperature, it is taken out of the freezer and the added solvent is drained off.

10. The alcogels are now under liquid solvent. The gel solvent is slowly replaced by the solvent in the manuclave.

11. The alcogels are allowed to soak under solvent (such as liquid $CO_2$) for 4 to 24 hours, depending on the size of the gel. New solvent is flushed through the vessel every 40 minutes to remove any built up gel solvent.

12. After the alcogels have been completely diffused through with the extraction solvent, the manuclave 10 is heated above the critical point of the solvent with a propane torch or other suitable heating element for a period of 1 to 24 hours.

13. Using the pressure control valve 18, gas is released periodically to keep the pressure within operating limits of the vessel, above the critical point of the extraction solvent. For $CO_2$, this is typically 1200 psi (85 $kg/cm^2$). This keeps the solvent above its critical point.

14. The manuclave 10 is held at supercritical conditions for 1 to 4 hours to ensure that all of the solvent has diffused out of the gels.

15. The manuclave 10 is depressurized slowly over 2 to 6 hours.

16. The newly formed aerogels can be removed.

IV. Procedure to Measure Aerogel Density

Aerogels are hydrophilic, meaning they soak up water rapidly or extract it from humid air. This is not desirable when trying to keep the aerogels intact since upon hydration, aerogels will revert to ordinary gels. Instead of using liquid displacement for measuring volume, a dry volumeter 24 shown in FIG. 2 is used to measure the volume of the aerogel. The volumeter 24 uses conventional dry cation exchange resin beads that are approximately 0.1 mm in diameter in place of water molecules, and weight displacement to accurately measure volume displaced. Any uniformly shaped, inert solid beads can be used. Smaller beads are better.

The dry volumeter 24 includes a lower funnel 26 having a wide lower end 28 with a base 29 extending across the lower end 28 and an open, narrow upper end 30. An upper funnel 32 has a narrow open end 34 and a wide open end 36. The narrow end 34 is releasably connected to the upper end 30 of the lower funnel 26, forming an hourglass shape for the volumeter 24.

The volumeter 24 is first calibrated by attaching the upper funnel 32 to the lower funnel 26 and filling the lower funnel 26 with the resin beads to a designated mark, then measuring the weight and volume of the volumeter 24 and the beads. The volumeter 24 is then emptied and disassembled in order to place an amount of aerogel 38 within the lower funnel 26. The upper funnel 32 is the reattached to the lower funnel 26, which is filled with beads a second time with the aerogel 38 inside the lower funnel 26. The apparatus is tapped to ensure all beads settle, and beads are added until no more beads can fit in the apparatus. Based on the relative weights of the volumeter 24 and beads, with and without the aerogel 38, the volume of the aerogel 38 can be calculated using the following formula:

$$\frac{\text{(weight of displaced beads)} * \text{(volume of total beads)}}{\text{(weight of total beads)}} = \text{aerogel volume}$$

Using a sensitive balance for all of these values allows for significant digits of 4 decimal places. By dividing the aerogel mass by the aerogel volume, density can be calculated.

V. Applications

The above procedures allow for unique formation and production of aerogel because of the rapid gelation time allowed and the controllability of the process to adjust the gel time. Because of its relatively straightforward, safe procedure, the multi-step catalysis procedure can be done almost anywhere with little difficulty, and can be done with little expense. The procedure is reliable, produces reproduceable aerogels, and can be done with inexpensive, impure reagents. The precursor sol (the alcogel liquid after the first catalysis) can be rapidly mixed with catalyst in a pipette or a beaker to be formed in mid-air or mid-motion, for instance, into tubes by squeezing out gelling precursor through a pipette, or in blobs from being splashed quickly.

The rapid gelation process allows for the use of aerogel on surfaces. Such applications of aerogels to surfaces could be microchips as transistor spacers. Aerogel has the highest R value of any solid insulation ever produced, and the rapid gelation process could be used to manufacture Dewar flasks, to spray-on aerogel insulation coatings, as packing material, housing insulation, industrial insulation, and insulation for lightweight aircraft, spacecraft, and cars.

Aerogel is a very strange, unique, and versatile substance. Its use has been limited by its limitations and costs. Rapid gelation allows for the production of aerogel inexpensively, and in many different shapes and applications that are impossible in previous procedures.

A. Microgravity Applications

The ability to use rapid gelation allows for research on the formation of aerogel in microgravity environments such as the KC-135 microgravity laboratory, which provides 20–30 seconds of microgravity at a time. By specifically adjusting the gel time of the alcogel solution, a gel can be formed in microgravity and taken back to the ground where it can be supercritically dried and studied. This allows for research on the production of transparent, non-blue aerogels.

B. Gaseous Catalysis and Production of Aerogel Thin Films

The procedure allows for gaseous catalysis of alcogel solutions. Ammonia gas can be used as a catalyst in the second catalysis, dissolving in a film of alcogel solution and causing it to gel rapidly. Because the gelation can be done so rapidly, the ammonia gas absorbed by the liquid precursor will dissolve and catalyze the solution to gel. This allows for applications of aerogel in many manufacturing processes that were previously not possible. The substrate, once coated with alcogel, can be placed in a supercritical dryer to produce an aerogel film on the substrate, or can be treated with non-supercritical drying techniques to produce high-density aerogel or xerogel films on the substrate.

Using gaseous catalysis, alcogel can be applied to surfaces including silicon and semiconductors, or sprayed onto a surface in an ammonia atmosphere allowing for the solution to gel instantly on the surface. The gel, when properly dried, allows for application of aerogel on a microscale for microcircuitry, and on a larger scale for applications such as insulation. A gelling precursor solution can be applied directly to a silicon wafer or sputter coated using a mask.

C. Production of Composite Silica Aerogel and Silica Xerogel Materials

Rapid gelation also allows for embedding of solids such as metals, organic and inorganic reagents, and particulate matter into aerogels by introducing the solid material into a gelling solution and applying vibration, since the gel can form around solid particles as the alcogel solution is shaken. This allows for high-dispersion of materials across a high surface area for chemical sensors, catalytic media, and phosphorescent media. Catalytic aerogels can use palladium, platinum, nickel, or other catalytic metals embedded in the alcogels by using rapid gelation, and could be used in applications such as catalytic converters and organic synthesis. Magnetic aerogels can be produced by embedding ferromagnetic particles into the aerogels.

Composite alcogels can be non-supercritically dried to produce composite xerogels. Such non-supercritical drying procedures typically involve extracting the solvent under heated vacuum conditions.

D. Production of Spherical Aerogels by Antibubble Gelation and Magnetorheological/Electrorheological Fluid Submersion Gelation Aerogel microspheres can be produced by using rapid gelation. Precursor set to gel in a one to three seconds can be added to a solution of water, surfactant, and solvent to control the density of the solution to be lower than the density of the alcogel solution. The alcogel precursor is dripped into the surfactant solution from a sufficient height, allowing for the formation of an antibubble of the precursor surrounded by a jacket of air. The precursor gels and sinks to the bottom of the surfactant solution. The gel has formed in the shape of a microsphere and can be removed from the surfactant solution. The size of the antibubbles defines the size of the microspheres produced, and is controlled by changing the allowed drop size of alcogel sol that enters the surfactant solution. Alcogel spheres are supercritically dried to make aerogel spheres. Aerogel microspheres could be used in chromatography columns and in catalysis reactions.

In an alternative method, antibubbles or bubbles of gelling alcogel solution are formed in a magnetorheological or electrorheological fluid. The fluid is then frozen by applying a magnetic field or a voltage across the fluid to rapidly increase its viscosity and effectively freeze it, trapping the gelling solution in place. The solution gels and the fluid is released, allowing the spherical gel to sink to the bottom of the container, where it can be collected. The gel is then washed off, aged and soaked as described in previous procedures and supercritically dried to form aerogel spheres.

E. Production/Preparation of Aerogel for Fabrics

Aerogel can be made into long, thin tubes using rapid gelation by squeezing gelling liquid into a tube through a pipette or dropper. Such tubes or aerogel microspheres are laminated with a viscous epoxy or slightly-melted plastic and are layered with traditional fibers like cotton or nylon to make highly insulating fabrics.

F. Lamination of Aerogel

Silica aerogels tend to be hydrophilic unless chemically altered, and are typically very fragile. Aerogels can be laminated with viscous epoxy or plastic as to not be absorbed by the aerogel and allowed to cool under an inert atmosphere (such as nitrogen or argon). This protects the aerogel from mechanical stress and exposure to water, allowing the aerogel to retain its monolithicity and physical properties.

G. Silica Lamination

Silica lamination covers an aerogel with thin layers of glass which protects the aerogel from mechanical stress and chemical exposure without introducing a material of different molecular composition to the aerogel. This provides a more durable, stronger protection seal.

The aerogel is slowly heated to 500–600 degrees F. in an inert atmosphere. A silica plate is then heated just past molten point. The aerogel is applied to the molten surface and allowed to fuse. The system is cooled to ambient conditions and the coated aerogel is monolithic. Alternatively, silica chips can be used instead of a silica plate.

In another method, melted glass is poured over the aerogel, forming a hard glass layer over the aerogel upon cooling that strengthens it for handling and for resisting absorption of liquid. This is less controllable, however, and results in uneven coating.

H. Snap-Together Aerogels

Figure 3B:
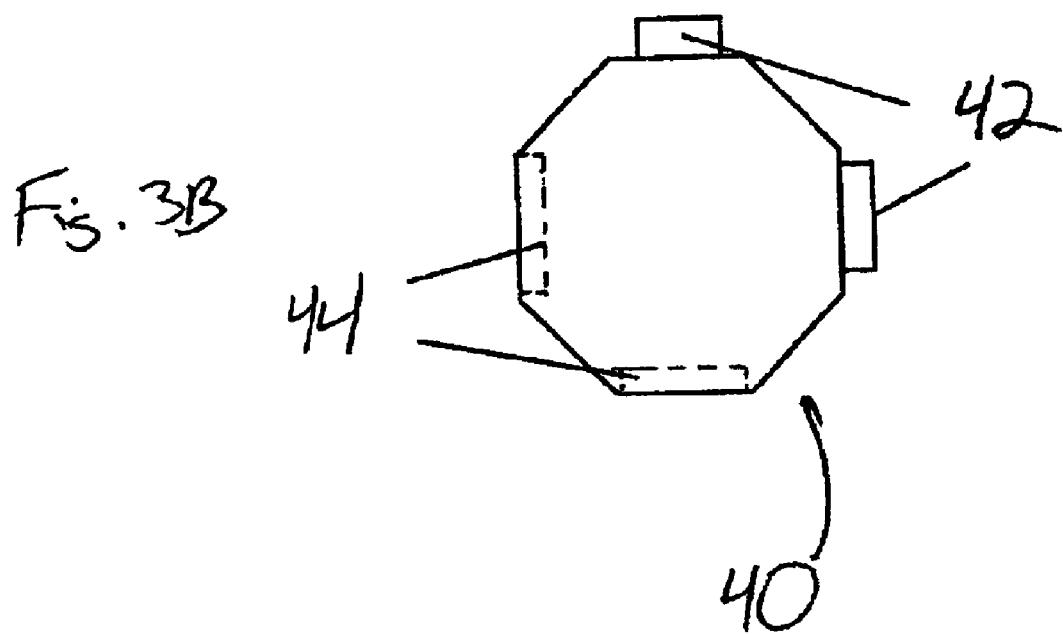

Aerogel blocks 40 can also be formed to have the shapes illustrated in FIG. 3. These blocks 40 are laminated using the procedures described above and include holes 42 and pegs 44 disposed on various parts of the block 40. The holes 42 and pegs 44 can be fitted together to form larger aerogel structures. Other designs of blocks in the arrangement of pegs and holes shown in FIG. 3 (other unit of blocks, such as 2×1) can be made to construct structures. Hexagonal, octagonal, and other multi-sided shaped blocks can also be used. The blocks fit together in modular fashion and can be made in any size.

I claim:

1. A method for forming aerogel comprising the steps of:
    a) providing an amount of an alkoxide;
    b) providing an amount of a first organic solvent;
    c) providing an amount of a catalyst;
    d) mixing the alkoxide, solvent and first amount of the catalyst to form a solution in which the alkoxide is precondensed, possibly adding further amounts of catalyst over a period of time (optional);
    e) providing a second amount of the catalyst;
    f) mixing the second amount of the catalyst with the solution to form an alcogel; and
    g) supercritically drying the alcogel to form an aerogel.
2. The method of claim 1 wherein the catalyst is a base or acid.
3. The method of claim 1 further comprising the step of optionally replacing the first organic solvent with a second organic solvent prior to supercritcally drying the alcogel.
4. The method of claim 3 wherein the non-flammable solvent is carbon dioxide can be optionally exchanged for the gel solvent.

5. The method of claim 3 wherein the step of replacing the first organic solvent with the second organic solvent comprises the steps of:
    a) providing a manuclave or other high-pressure vessel (such as a supercritical dryer) including a tank, a liquid drain valve on the tank, a valve assembly disposed on the tank and spaced from the drain valve, and a cap releasably secured to the tank;
    b) placing the alcogel in the tank;
    c) filing the tank with a solvent;
    d) draining the first solvent through the drain valve.
6. The method of claim 5 further comprising the step of cooling the tank after introducing the second solvent.
7. The method of claim 5 further comprising the steps of:
    a) heating the tank after draining the first solvent; and
    b) depressurizing the tank.
8. The method of claim 1 further comprising the step of waiting a specified amount of time after mixing the alkoxide, the first solvent and the first amount of the catalyst.
9. The method of claim 8 wherein the specified amount of time is between about 3 hours and about 48 hours.
10. The method of claim 9 wherein the specified amount of time is between about 15 hours and about 20 hours.
11. The method of claim 1 wherein the step of mixing the alkoxide, the first solvent and the first amount of the catalyst is performed in a mold.
12. The method of claim 1 wherein steps (a)–(f) take place in a state of altered gravity.
13. An aerogel formed from a process comprising the steps of:
    a) providing an amount of an alkoxide;
    b) providing an amount of a first organic solvent;
    c) providing a first amount of a catalyst;
    d) mixing the alkoxide, first solvent and first amount of the catalyst to form a solution in which the alkoxide is precondensed, possibly adding further amounts of catalyst over a period of time (optional);
    e) providing a second amount of a catalyst;
    f) mixing the second amount of the catalyst with the solution to form an alcogel; and
    g) supercritically drying the alcogel to form an aerogel.
14. The aerogel of claim 13 wherein the alkoxide, the first organic solvent and the first amount of the catalyst are mixed in a mold.
15. The aerogel of claim 14 wherein the mold is shaped to form the aerogel into a block having a number of pegs and a number of holes capable of interconnecting blocks with one another.
16. The aerogel of claim 14 wherein the aerogel can be used to form a fabric fiber.
17. The aerogel of claim 14 wherein the aerogel can be laminated to increase the strength of the aerogel.
18. The aerogel of claim 17 wherein the aerogel is laminated with the component selected from the group consisting of: an epoxy, a plastic, and silica.
19. The aerogel of claim 13 wherein the process further comprises the step of waiting a specified amount of time after mixing the alkoxide, the first solvent and the first amount of the catalyst, with the amount of time determining the properties of the aerogel.
20. The aerogel of claim 19 wherein the specified amount of time is between about 3 hours and about 48 hours.
21. The aerogel of claim 13 wherein the aerogel is transparent.
22. The aerogel of claim 21 wherein the aerogel shows reduced blue-violet Rayleigh scattering.

* * * * *